(12) United States Patent
Inuduka et al.

(10) Patent No.: US 8,362,733 B2
(45) Date of Patent: Jan. 29, 2013

(54) OUTPUT FILTER AND MOTOR DRIVE SYSTEM INCLUDING THE SAME

(75) Inventors: Aiko Inuduka, Kitakyushu (JP); Tsuyoshi Higuchi, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 13/308,550

(22) Filed: Dec. 1, 2011

(65) Prior Publication Data

US 2012/0068655 A1 Mar. 22, 2012

(30) Foreign Application Priority Data

Aug. 19, 2009 (JP) ................................. 2009-189965

(51) Int. Cl.
*H02P 1/00* (2006.01)
(52) U.S. Cl. ......... 318/494; 318/508; 318/801; 318/807
(58) Field of Classification Search .................. 318/768, 318/800, 801, 807, 813, 814, 494, 503, 508; 318/509, 510; 323/205, 207, 208, 232, 233; 363/39, 40, 45, 47
See application file for complete search history.

(56) References Cited

U.S. PATENT DOCUMENTS

| 3,475,702 | A | * | 10/1969 | Ainsworth | .................... | 333/17.1 |
|---|---|---|---|---|---|---|
| 4,544,899 | A | * | 10/1985 | Townsend et al. | ........... | 333/17.1 |
| 5,661,390 | A | * | 8/1997 | Lipo et al. | ..................... | 318/803 |
| 5,686,806 | A | * | 11/1997 | Hibbard | ......................... | 318/800 |
| 5,831,842 | A | * | 11/1998 | Ogasawara et al. | ............. | 363/40 |
| 6,208,537 | B1 | * | 3/2001 | Skibinski et al. | ............... | 363/40 |
| 6,504,732 | B2 | * | 1/2003 | Abe | ................. | 363/17 |
| 7,084,604 | B2 | * | 8/2006 | Salomaki | ...................... | 318/811 |
| 7,672,149 | B2 | * | 3/2010 | Falk | .............................. | 363/98 |
| 7,948,779 | B2 | * | 5/2011 | Bauer et al. | ..................... | 363/41 |

FOREIGN PATENT DOCUMENTS

| JP | 08-126201 | 5/1996 |
|---|---|---|
| JP | 09-084357 | 3/1997 |
| JP | 2008-236817 | 10/2008 |

OTHER PUBLICATIONS

International Search Report for International Application No. PCT/JP2010/062685, Oct. 26, 2011.
Written Opinion of the International Searching Authority Application No. PCT/JP2010/062685, Oct. 26, 2011.

* cited by examiner

*Primary Examiner* — Walter Benson
*Assistant Examiner* — Thai Dinh
(74) *Attorney, Agent, or Firm* — Ditthavong Mori & Steiner, P.C.

(57) ABSTRACT

A motor drive system includes: a three-phase motor; a power conversion device that supplies power for driving the three-phase motor; and an output filter that is arranged between an output of the power conversion device and the three-phase motor and has a configuration in which a setting value of a filter resonance frequency is selectable and changeable.

9 Claims, 5 Drawing Sheets

OUTPUT FILTER AND MOTOR DRIVE SYSTEM INCLUDING THE SAME

CROSS-REFERENCE TO RELATED APPLICATIONS

The present application claims priority to Japanese Patent Application No. PCT/JP2010/062685, filed on Jul. 28, 2010, which claims priority to Japanese Patent Application No. 2009-189965, filed Aug. 19, 2009. The contents of these applications are incorporated herein by reference in their entirety.

BACKGROUND OF THE INVENTION

1. Field of the Invention

The present invention relates to an output filter and a motor drive system including the same.

2. Discussion of the Background

For example, Japanese Unexamined Patent Publication No. 1997-84357 describes that an output filter includes: a common mode voltage divider; a neutral point detection circuit connected in parallel to an output of the common mode voltage divider; and a bypass circuit connected in series to an output of the neutral point detection circuit 103. In a common mode, this output filter constitutes an L-C low-pass filter, which is formed of inductances L of the common mode voltage divider, and capacitors C of the neutral point detection circuit and the bypass circuit.

SUMMARY OF THE INVENTION

According to one aspect of the present invention, a motor drive system includes: a three-phase motor; a power conversion device that supplies power for driving the three-phase motor; and an output filter that is arranged between an output of the power conversion device and the three-phase motor and has a configuration in which a setting value of a filter resonance frequency is selectable and changeable.

According to another aspect of the present invention, a motor drive system includes: a three-phase motor; a power conversion device that supplies power for driving the three-phase motor; and an output filter including a plurality of secondary low-pass filters arranged between an output of the power conversion device and the three-phase motor, each secondary low-pass filter being formed of an inductance and a capacitor in a common mode.

According to another aspect of the present invention, an output filter includes: a configuration in which setting values of a plurality of filter resonance frequencies are selectable and changeable, the setting values being lower than a setting value of a switching frequency in PWM control of a power conversion device connected to the output filter and higher than an operation frequency of the power conversion device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
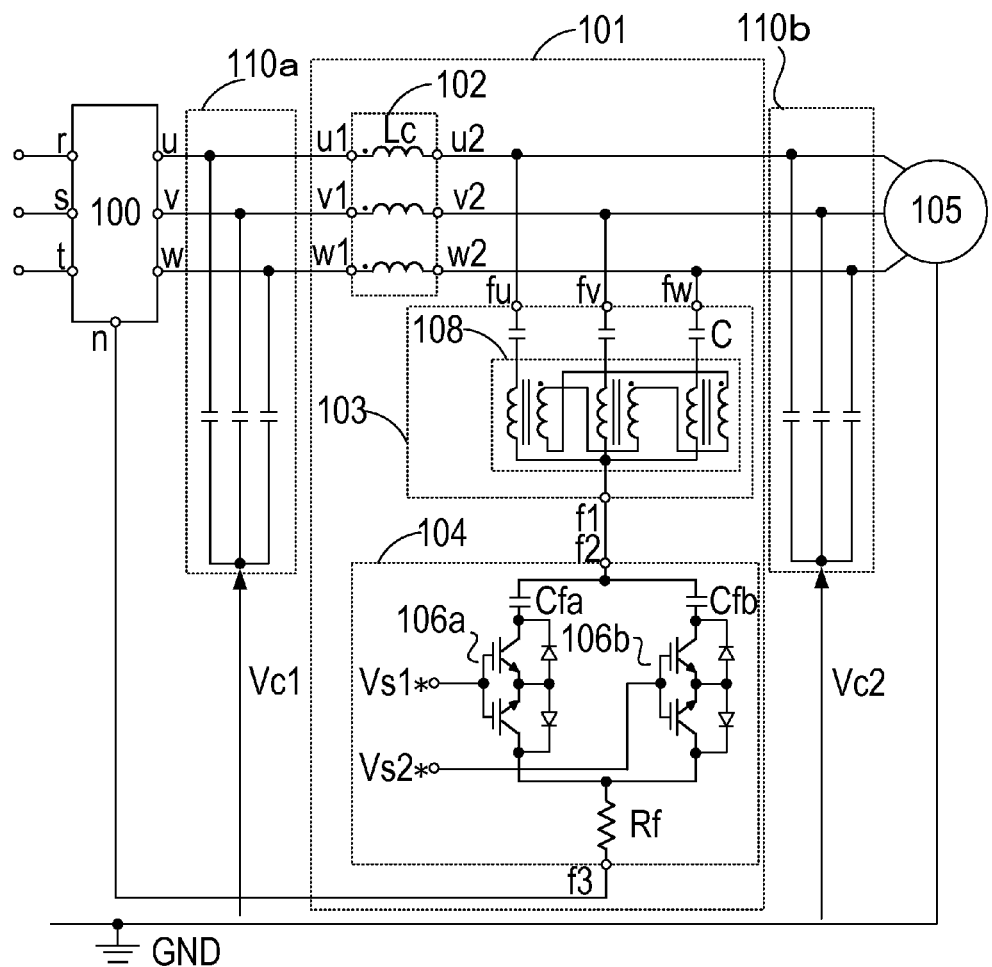
FIG. 1 is a block diagram showing configurations of an output filter in an embodiment of the present invention and a motor drive system including the same.

Embodiments will now be described with reference to the accompanying drawings, wherein like reference numerals designate corresponding or identical elements throughout the various drawings.

FIG. 1 is a configuration diagram of an output filter in an embodiment of the present invention and a motor drive system including the same. In FIG. 1, the motor drive system includes a power conversion device 100 and an output filter 101, and drives a motor 105.

A commercial power supply is connected to input terminals r, s, and t of the power conversion device 100. The commercial power supply is, for example, an alternating current power supply of AC 200 V or AC 100 V. Output terminals u, v, and w of the power conversion device 100 are output terminals of a PWM inverter (not shown). The output filter 101 is connected between the power conversion device 100 and the motor 105.

The output filter 101 includes: a common mode voltage divider 102; a neutral point detection circuit 103 connected in parallel to output terminals u2, v2, and w2 of the common mode voltage divider 102; and a bypass circuit 104 connected in series to an output terminal f1 of the neutral point detection circuit 103.

The common mode voltage divider 102 includes common mode choke coils with an inductance value of Lc.

The neutral point detection circuit 103 includes capacitors C and a neutral point detection transformer. This neutral point detection transformer is composed, for example, of a three-phase reactor 108. One-side terminals of the three-phase reactor 108 on a primary side are connected to one-side ends of the capacitors C dispersedly connected to the respective phases of the output terminals u2, v2 and w2 of the common mode voltage divider 102. Moreover, other ends of the three-phase reactor 108 on the primary side are subjected to a star connection to thereby create a neutral point. Furthermore, secondary sides of the three-phase reactor 108 are subjected to a delta connection.

This neutral point detection transformer functions as a normal inductance among the respective phases of the output terminals u2, v2 and w2 of the common mode voltage divider 102. A common mode inductance synthesized between each of the phases and the neutral point is zero. In the event of considering a common mode voltage, it is possible to ignore this neutral point detection transformer. Note that this neutral point of the neutral point detection transformer is defined as an output terminal f1 of the neutral point detection circuit 103.

The bypass circuit 104 has a configuration to be described later. One end f2 of the bypass circuit 104 is connected to the output terminal f1 of the neutral point detection circuit 103, and other end f3 thereof is connected to a neutral point n of the power conversion device 100. It is assumed that impedance of this bypass circuit 104 is selected to be sufficiently lower than impedance by stray capacitances between windings and frames of the motor 105, and by resistance and inductance of a wire (ground wire).

Note that, with regard to this neutral point n, two capacitors with the same capacitance, which are connected in series to each other, are connected in parallel between terminals of a direct current output voltage in a rectifying circuit (not shown) included in the power conversion device 100, and a connection point between these two capacitors is defined as the neutral point n.

As described above, in a common mode, the output filter 101 can be regarded as an L-C low-pass filter equivalent thereto, which includes: inductances Lc of the common mode voltage divider 102; and the capacitors C of the neutral point detection circuit 103 and capacitors Cfa and Cfb of the bypass circuit 104.

Note that common mode voltage measurement capacitors 110a and 110b under a Y-connection, which are connected to an input side and an output side of the output filter 101, respectively, are those for measuring and observing common mode voltages Vc1 and Vc2.

Here, a description is made of a phenomenon that, in such a case of operating the motor while changing a setting value of a carrier frequency in PWM control of the power conversion device, the common mode voltages superimposed on an output voltage of the power conversion device are excited and amplified when the setting value of the carrier frequency comes close to a resonance frequency of the output filter.

As shown in FIG. 1, in the case where an electrically neutral point is created for the output terminals u, v and w of the power conversion device 100 through the common mode voltage measurement capacitor 110a, a voltage to the ground at this neutral point is the common mode voltage Vc1. This common mode voltage Vc1 becomes a pulse-like voltage waveform in which the carrier frequency in the PWM control of the power conversion device 100 is a fundamental wave. This common mode voltage Vc1 is represented by Equation (1).

$$Vc1=(Vug+Vvg+Vwg)/3 \qquad (1)$$

where Vc1 is the common mode voltage, and Vug, Vvg, and Vwg are the respective output phase voltages of the power conversion device 100 while taking the ground (GND) as a reference.

This common mode voltage Vc1 uses, as the fundamental wave, the carrier frequency in the PWM control of the power conversion device 100. Accordingly, when the setting value of this carrier frequency comes close to the resonance frequency of the output filter 101, and the output filter 101 resonates, the common mode voltage Vc1 is also excited and amplified by this resonance. In such a case, there occurs an overvoltage phenomenon in the output voltage of the power conversion device 100, and the motor cannot be operated while changing the setting value of the carrier frequency in the PWM control.

The output filter in the embodiment of the present invention and the motor drive system including the same largely reduce the common mode voltage of the carrier frequency component in the PWM control of the power converter. Moreover, even if the motor is operated while changing the carrier frequency, there can be largely reduced such a phenomenon that the carrier frequency comes close to the resonance frequency of the output filter to thereby excite the common mode voltage superimposed on the output voltage of the power conversion device.

Figure 2:
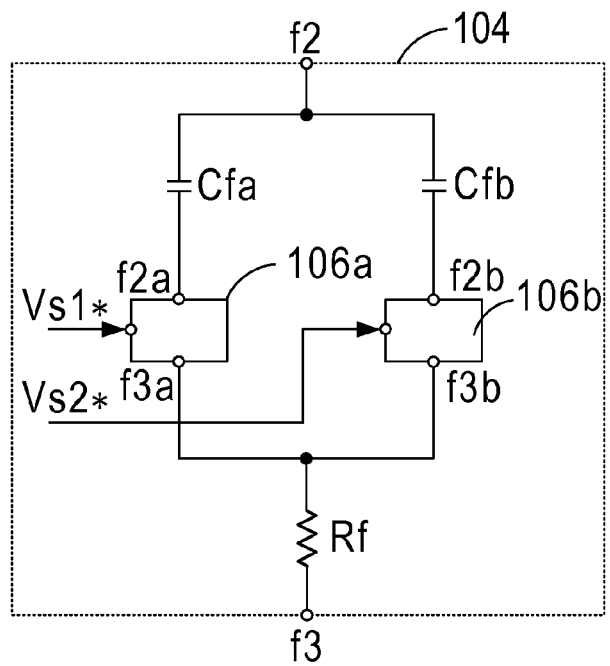
FIG. 2 is a configuration diagram of a bypass circuit 104.

A description is made below of a configuration of the bypass circuit 104. FIG. 2 is a configuration diagram of the bypass circuit 104. The bypass circuit 104 includes: bypass route switching switches 106a and 106b; the capacitors Cfa and Cfb different in capacitance from each other; and a resistor Rf.

In FIG. 2, the capacitors Cfa and Cfb are connected in series to the bypass route switching switches 106a and 106b, respectively. These two series circuits are connected in parallel to each other, and further, the resistor Rf is connected in series to this parallel circuit.

Functions and effects of the resistor Rf are changed depending on a control method (for example, a two-phase modulation mode and a three-phase modulation mode) for the PWM inverter (not shown) of the power conversion device 100. For example, in the case of operating the power conversion device 100 in the two-phase modulation mode, the common mode voltage has a resonance component, and resonates with the resonance frequency of the output filter. The resistor Rf suppresses this resonance of the resonance frequency.

Figure 3:
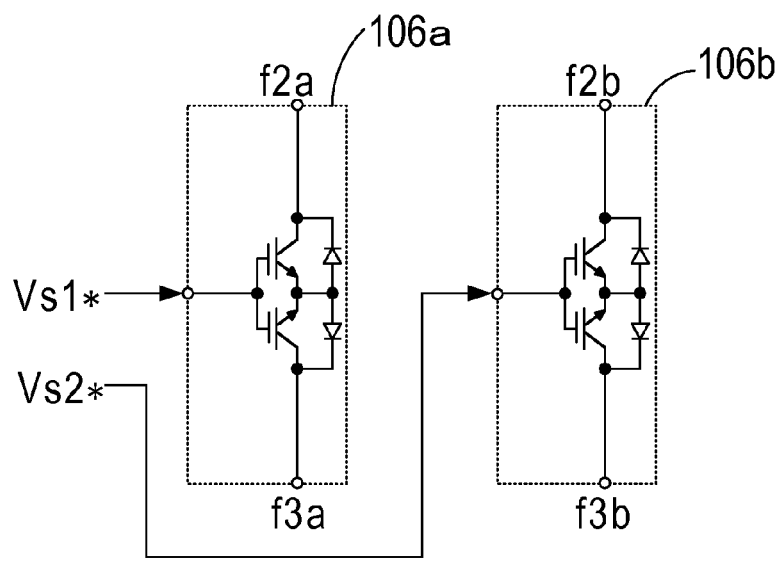
FIG. 3 is a configuration diagram of bypass route switching switches 106a and 106b.

FIG. 3 is a configuration diagram of the bypass route switching switches 106a and 106b. In FIG. 3, each of the bypass route switching switches 106a and 106b includes a bidirectional switch in which two semiconductor switches having diodes connected in anti-parallel to transistors or IGBTs are connected in series to each other so that electrification directions thereof can be opposite to each other. A control circuit (not shown) in the power conversion device 100 performs ON/OFF (open/close) control for the bidirectional switches by switching signals Vs1* and Vs2*. By this ON/OFF (open/close) control, bypass routes in the bypass route in the bypass circuit 104 are selected and switched. That is to say, impedance Z of the bypass circuit 104 is switched as in Equation (2) or Equation (3) by changing the setting value of the carrier frequency f in the PWM control of the power conversion device 100.

$$Z=Rf+1/(j2\pi fCfa) \qquad (2)$$

$$Z=Rf+1/(j2\pi fCfb) \qquad (3)$$

As described above, the control circuit (not shown) in the power conversion device 100 selects and switches the bypass circuits by using the bypass route switching switches 106a and 106b, whereby the resonance frequency of the output filter 101 can be changed. Note that a configuration of the bidirectional switches as the bypass route switching switches 106a and 106b shown in FIG. 3 merely illustrates an example, and the configuration is not limited thereto. For example, unidirectional switches, in each of which a diode is connected in series to a transistor or an IGBT, are connected in anti-parallel to each other, whereby the bidirectional switches can also be formed.

FIG. 4 is again characteristic diagram in the common mode of the output filter 101. As described above, the output filter 101 can be regarded as the L-C low-pass filter equivalent thereto in the common mode. This equivalent L-C low-pass filter is a secondary low-pass filter, and the resonance frequency fr thereof can be switched by such bidirectional switches 106a and 106b of the bypass circuit 104. That is to say, this resonance frequency fr is represented by Equation (4) or Equation (5).

$$fra=1/(2\pi(Lc \cdot Ctotal\_a)^{1/2}) \qquad (4)$$

$$frb=1/(2\pi(Lc \cdot Ctotal\_b)^{1/2}) \qquad (5)$$

where Ctotal_a=(3C·Cfa)/(3C+Cfa), and Ctotal_b= (3C·Cfb)/(3C+Cfb). The resonance frequency fra is a resonance frequency in the case of controlling the bidirectional switch 106a of the bypass circuit 104 to turn on, and the resonance frequency frb is a resonance frequency in the case of controlling the bidirectional switch 106b of the bypass circuit 104 to turn on.

Figure 4:
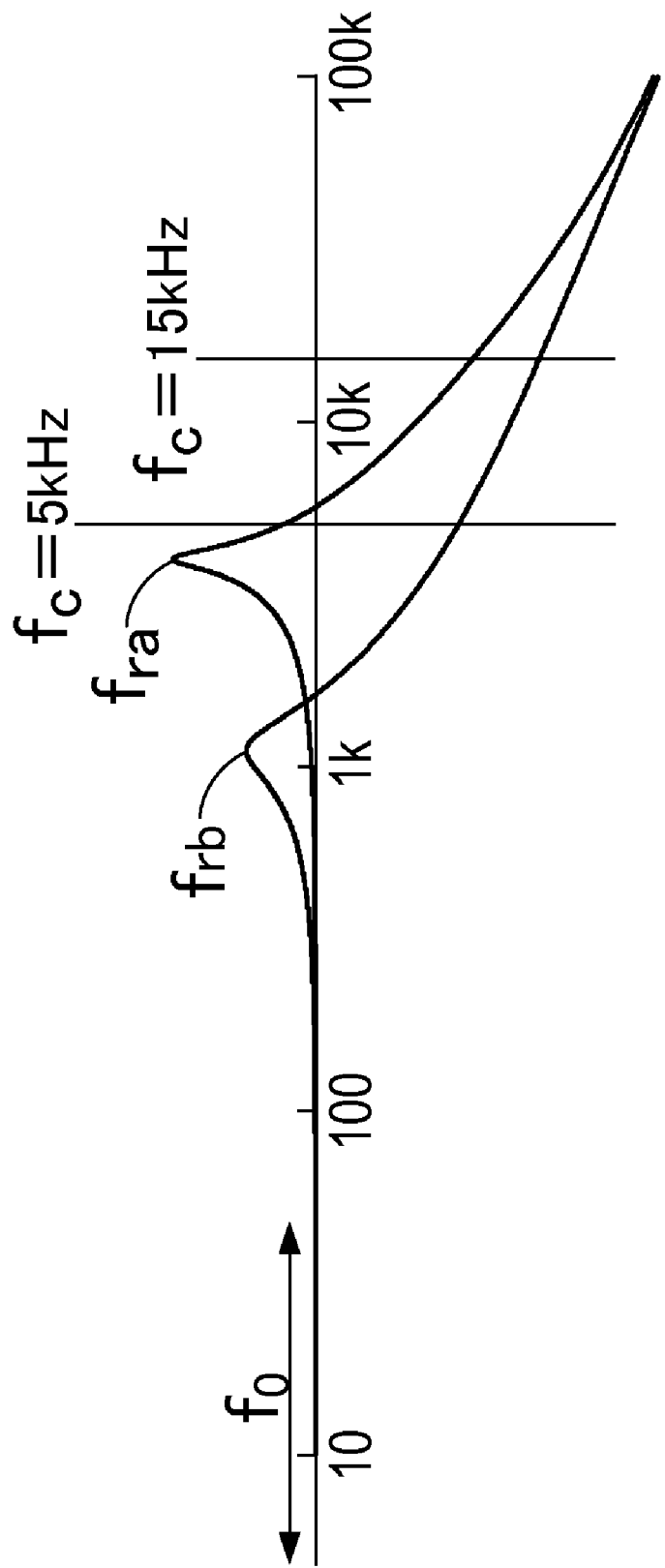
FIG. 4 is a gain characteristic diagram in a common mode of an output filter 101.

In FIG. 4, in the case where the motor drive system operates the motor within a range of an operation frequency f0, and the motor is operated while changing the setting value of the carrier frequency fc in the PWM control of the power conversion device, the resonance frequency fra is set so as to become sufficiently lower in comparison with this carrier frequency fc (=15 kHz), and to become sufficiently higher in comparison with the operation frequency f0 of the motor. Moreover, the resonance frequency frb is set so as to become sufficiently lower in comparison with this carrier frequency fc (=5 kHz), and to become sufficiently higher in comparison with the operation frequency f0 of the motor.

Note that a level of this "sufficiently" differs depending on a specific usage purpose, and cannot be uniquely defined. For example, it is necessary to set the resonance frequency values of Equation (4) and Equation (5) so that noise and vibration levels of the motor can satisfy predetermined specification conditions, and further, that such standard conditions of conductive EMI as represented by CISPR 11, IEC 61800-3 and the like can be cleared.

As an example, if the following Equation (7) can be satisfied, then it is possible to reduce at least a malfunction such as an occurrence of the overvoltage of the output voltage of the power conversion device, which is caused by the excitation.

$$20 \log |Vc2/Vc1| < 0 \qquad (7)$$

As described above, the control circuit (not shown) in the power conversion device 100 switches the bypass routes by the bypass route switching switches 106a and 106b, whereby the resonance frequency of the output filter 101 can be changed.

Figure 5:
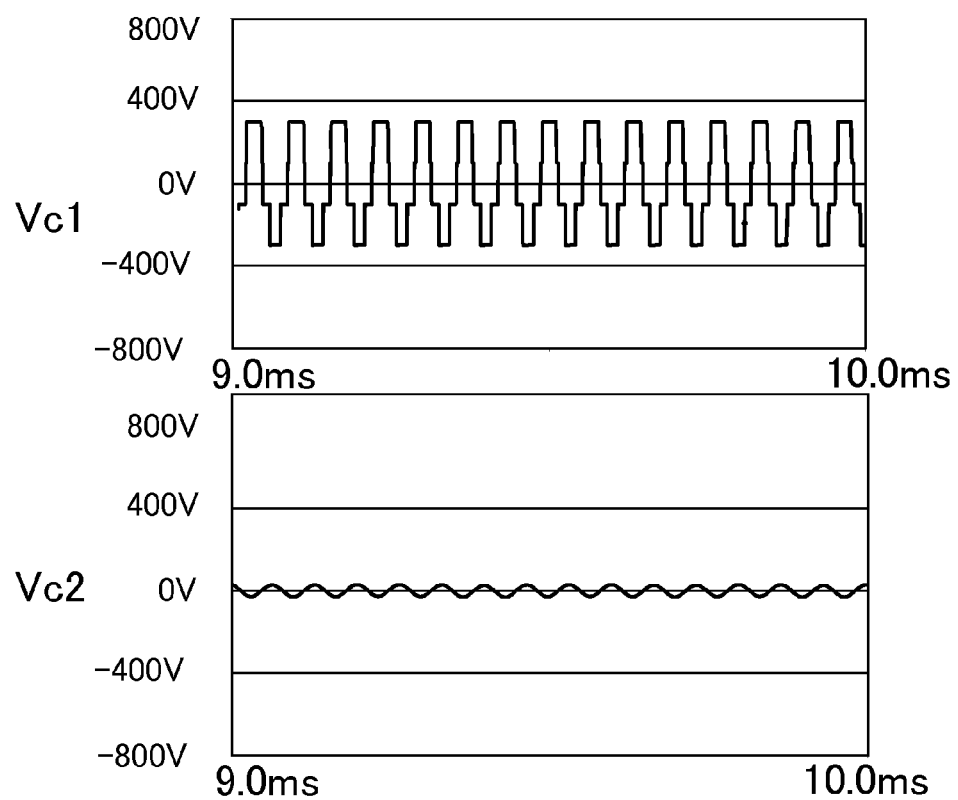
FIG. 5 is simulation waveform diagrams of common mode voltages Vc1 and Vc2 when a carrier frequency fc is equal to 15 kHz.
Figure 6:
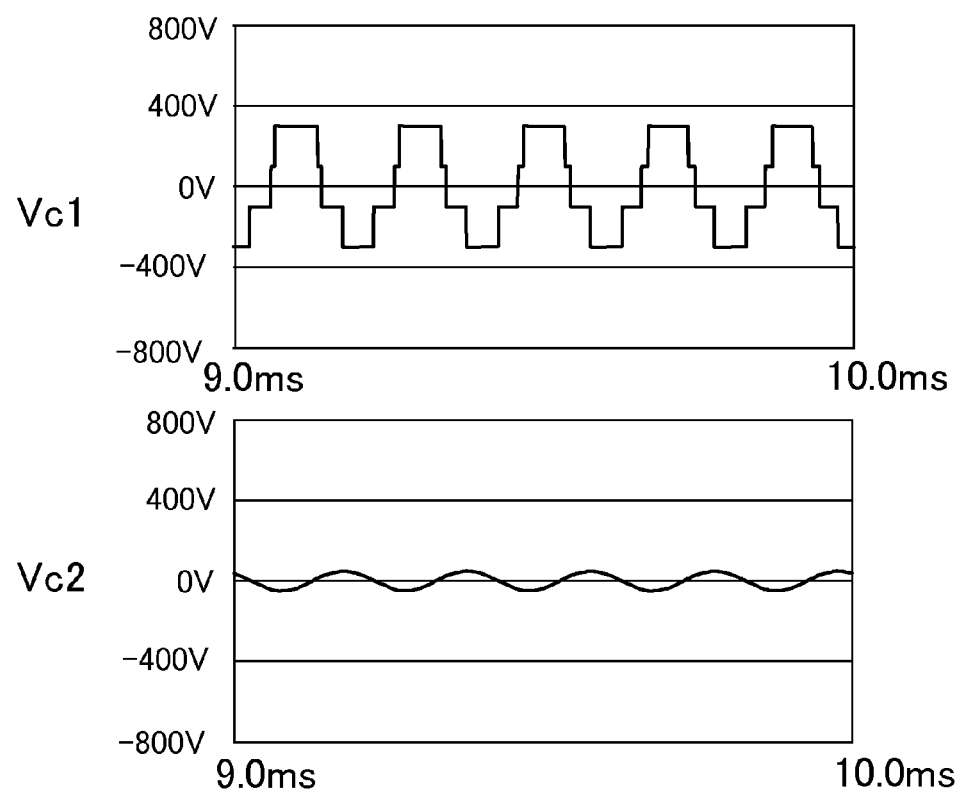
FIG. 6 shows simulation waveform diagrams of the common mode voltages Vc1 and Vc2 when the carrier frequency fc is equal to 5 kHz.

FIG. 5 is a simulation waveform diagrams of the common mode voltages Vc1 and Vc2 in the input/output of the output filter 101 when the setting value of the carrier frequency fc in the PWM control of the power conversion device is 15 kHz. FIG. 6 is a simulation waveform diagrams of the common mode voltages Vc1 and Vc2 in the input/output of the output filter 101 when the setting value of the carrier frequency fc in the PWM control of the power conversion device is 5 kHz.

In the case of FIG. 5, as simulation conditions, the operation frequency is 60 Hz, Lc is equal to 4 mH, and Ctotal_a is equal to 0.25 µF. In the case of FIG. 6, as simulation conditions, the operation frequency is 60 Hz, Lc is equal to 4 mH, and Ctotal_b is equal to 5.0 µF. Note that, in FIG. 5 and FIG. 6, as described above, the impedance Z of the bypass circuit 104 is switched as in Equation (2) or Equation (3) by changing the setting value of the carrier frequency fc in the PWM control of the power conversion device 100.

In FIG. 5, in comparison with the common mode voltage Vc1 in the input of the output filter 101, the common mode voltage Vc2 in the output of the output filter 101 is largely reduced. As can be seen from the gain characteristic diagram in FIG. 4, this is because attenuation characteristics of the output filter 101 having the resonance frequency fra are increased when the carrier frequency fc in the PWM control of the power conversion device 100 is equal to 15 kHz In FIG. 6, in comparison with the common mode voltage Vc1 in the input of the output filter 101, the common mode voltage Vc2 in the output of the output filter 101 is largely reduced. As can be seen from the gain characteristic diagram in FIG. 4, this is because, by the fact that the impedance Z of the bypass circuit 104 is changed, the resonance frequency of the output filter 101 is lowered from fra to frb, and the attenuation characteristics of the output filter 101 having the resonance frequency frb are increased also when the carrier frequency fc in the PWM control of the power conversion device 100 is equal to 5 kHz.

As described above, by the bypass route switching switches 106a and 106b, the bypass routes are switched so as to correspond to the change of the setting value of the carrier frequency in the PWM control of the power conversion device. In such a way, the phenomenon that the common mode voltage superimposed on the output voltage of the power conversion device is excited and amplified to then reach the overvoltage can be reduced to the maximum. Moreover, this phenomenon can be reduced by such an attenuation effect of the output filter 101. As a result, even if the setting value of the carrier frequency is changed, the motor can be operated.

Note that, in this embodiment, the description has been made of such a switching configuration of two circuits 106a and 106b as the bypass route switching switches in the case of changing the setting value of the carrier frequency in the PWM control of the power conversion device. For a usage purpose of changing this carrier frequency in a wide frequency range, for example, in the case of changing the carrier frequency at multiple levels, or in the case of continuously changing the carrier frequency, it is needless to say that it is possible to form the bypass route switching switches as a switching circuit with a multilevel configuration having two or more circuits.

Moreover, even in the case of such a usage purpose of operating the motor while changing the setting value of this carrier frequency, since it becomes possible to form an output filter with larger attenuation characteristics, there is also an effect that there can be provided a power conversion device such as an inverter device, in which an influence of high frequency noise in the power conversion device is further reduced, and attention is further paid to the environment.

In this embodiment, in the motor drive system using the power conversion device, the description has been made of the method of suppressing the excitation of the common mode voltage in the case of operating the motor while changing the setting value of the carrier frequency in the PWM control of the power conversion device. The present invention is not limited to such an example. In a usage purpose of improving power supply characteristics by changing a setting value of a carrier frequency of PWM switching in a power supply device and the like, the bypass route of the output filter is switched so as to correspond to such a change of the setting value of this carrier frequency, whereby a resonance point of the output filter can be changed. Therefore, even if the setting value of the carrier frequency is freely changed, it becomes possible to reduce the occurrence of the overvoltage caused by the excitation of the common mode voltage.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A motor drive system comprising:
    a three-phase motor;
    a power conversion device to supply power to the three-phase motor; and
    an output filter that is arranged between an output of the power conversion device and the three-phase motor and has setting values of a filter resonance frequency, the output filter including a bypass circuit that has a plurality of bypass route switching switches to select any one of the setting values of the filter resonance frequency based on switching signals.

2. The motor drive system according to claim 1, wherein the setting values of the filter resonance frequency are lower than a setting value of a switching frequency in PWM control of the power conversion device and higher than an operation frequency of the power conversion device.

3. The motor drive system according to claim 1, wherein in the output filter,
any one of the setting values of the filter resonance frequency is selected by the bypass route switching switches based on the switching signals corresponding to an operation frequency of the power conversion device.

4. A motor drive system comprising:
a three-phase motor;
a power conversion device to supply power to the three-phase motor; and
an output filter that is arranged between an output of the power conversion device and the three-phase motor and has a configuration in which a setting value of a filter resonance frequency is selectable and changeable, the output filter comprising:
  a common mode voltage divider in which common mode choke coils are individually connected between respective phase outputs of the power conversion device and respective phases of the three-phase motor;
  a neutral point detection circuit that has a three-phase reactor and capacitors, in which respective phase one-side ends of the three-phase reactor on a primary side are individually connected to respective phase outputs of the common mode voltage divider through the capacitors, and respective phase other-side ends of the three-phase reactor on the primary side are subjected to a star connection to thereby create a circuit output, and secondary sides of the three-phase reactor are subjected to a delta connection; and
  a bypass circuit that has a plurality of bypass route switching switches to select any one of setting values of the filter resonance frequency.

5. The motor drive system according to claim 4, wherein in the bypass circuit,
a plurality of series connection bodies, in each of which one-side end of the bypass route switching switch and one-side end of another capacitor are connected to each other, are provided, and the series connection bodies are connected in parallel to one another, and
one-side ends of the series connection bodies are connected to the circuit output of the neutral point detection circuit, and other-side ends of the series connection bodies are connected to a neutral point of the power conversion device through a single resistor.

6. The motor drive system according to claim 4, wherein the bypass route switching switch is switched based on a switching signal outputted by the power conversion device, the switching signal corresponding to an operation frequency of the power conversion device.

7. A motor drive system comprising:
a three-phase motor;
a power conversion device to supply power to the three-phase motor; and
an output filter including a plurality of secondary low-pass filters arranged between an output of the power conversion device and the three-phase motor, each of the secondary low-pass filters being formed of an inductance and a capacitor in a common mode, the secondary low-pass filters respectively having setting values of a filter resonance frequency different from each other, the output filter including a plurality of bypass route switching switches to select any one of the secondary low-pass filters based on switching signals.

8. The motor drive system according to claim 7, wherein the setting values of the filter resonance frequency are lower than a setting value of a switching frequency in PWM control of the power conversion device and higher than an operation frequency of the power conversion device.

9. The motor drive system according to claim 7, wherein in the output filter,
any one of the plurality of secondary low-pass filters is selected by the bypass route switching switches based on the switching signals corresponding to an operation frequency of the power conversion device.

\* \* \* \* \*

UNITED STATES PATENT AND TRADEMARK OFFICE
CERTIFICATE OF CORRECTION

| | | |
|---|---|---|
| PATENT NO. | : 8,362,733 B2 | Page 1 of 1 |
| APPLICATION NO. | : 13/308550 | |
| DATED | : January 29, 2013 | |
| INVENTOR(S) | : Aiko Inuduka and Tsuyoshi Higuchi | |

It is certified that error appears in the above-identified patent and that said Letters Patent is hereby corrected as shown below:

Title page, below Item (65) should include the following:

(63) Continuation of application No. PCT/JP2010/062685, filed on Jul. 28, 2010.

Signed and Sealed this
Ninth Day of April, 2013

Teresa Stanek Rea
*Acting Director of the United States Patent and Trademark Office*